Patented Apr. 12, 1949

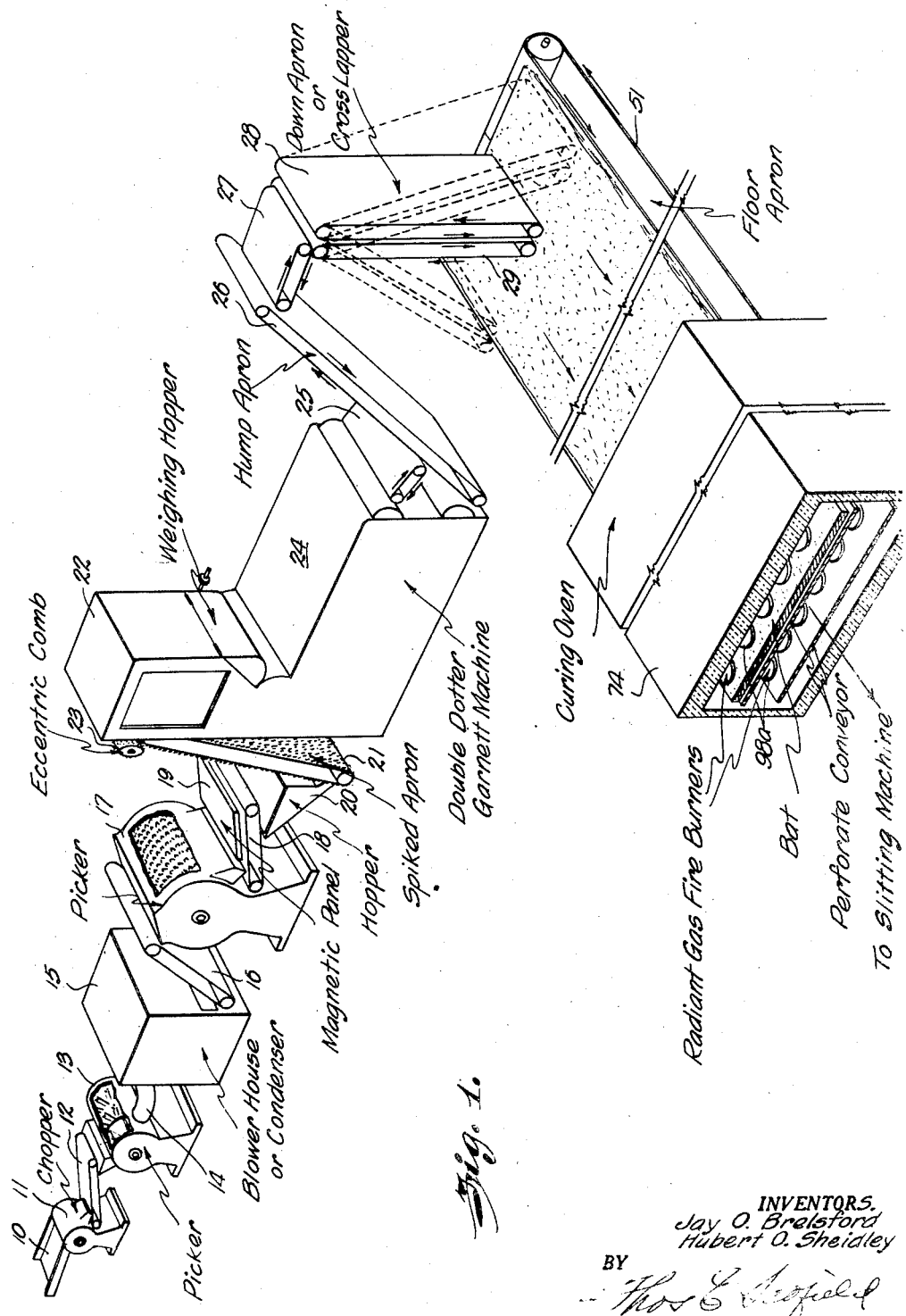

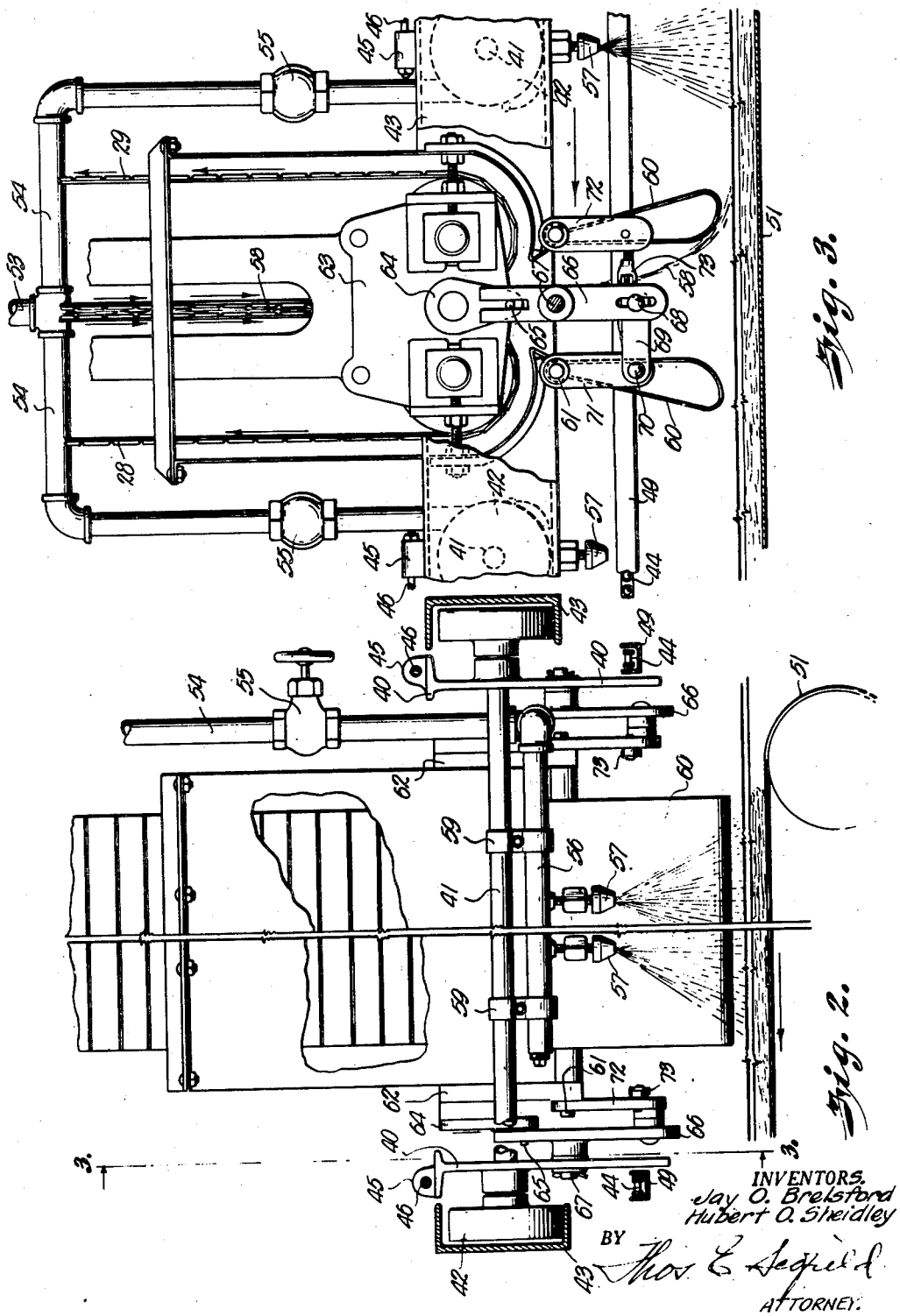

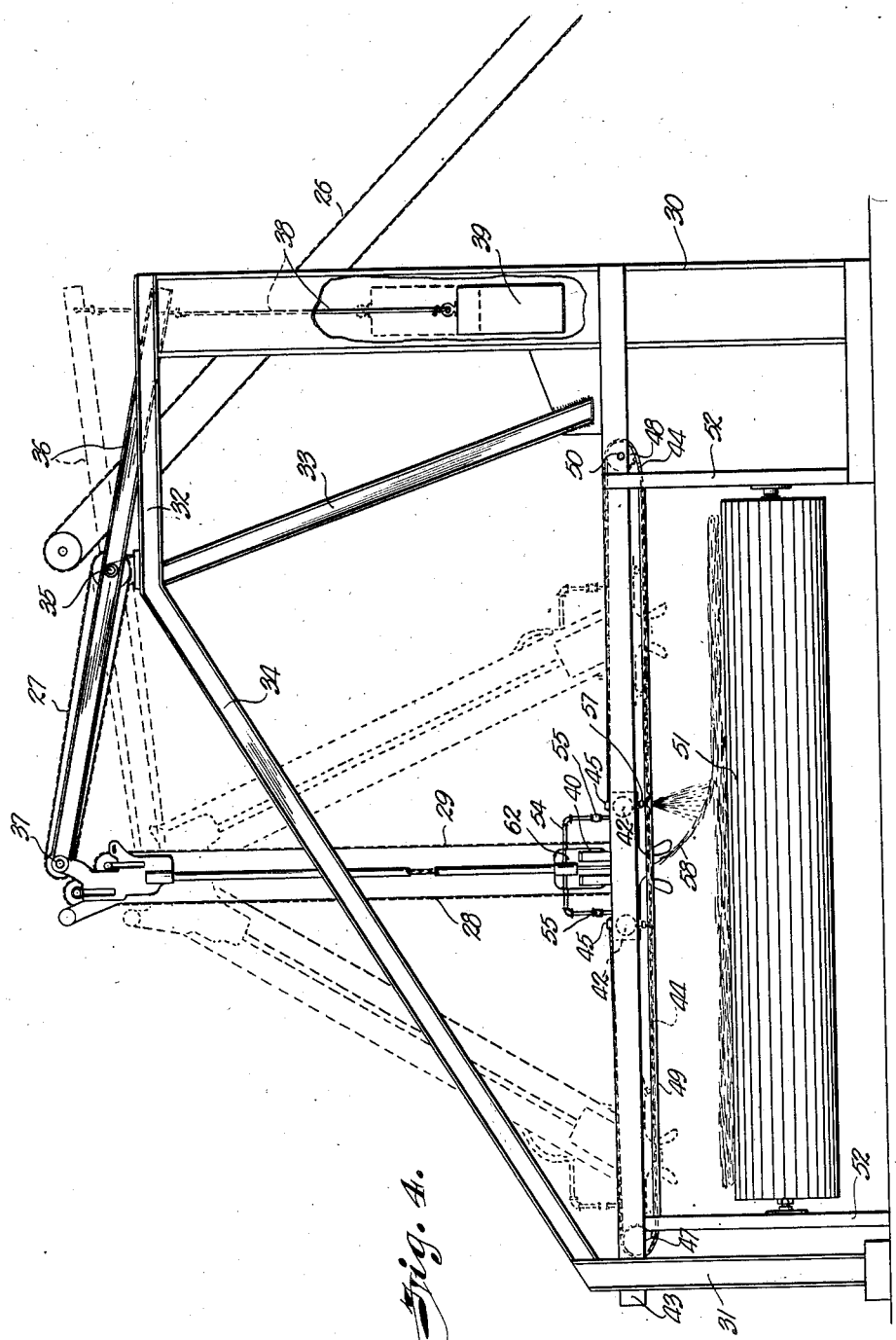

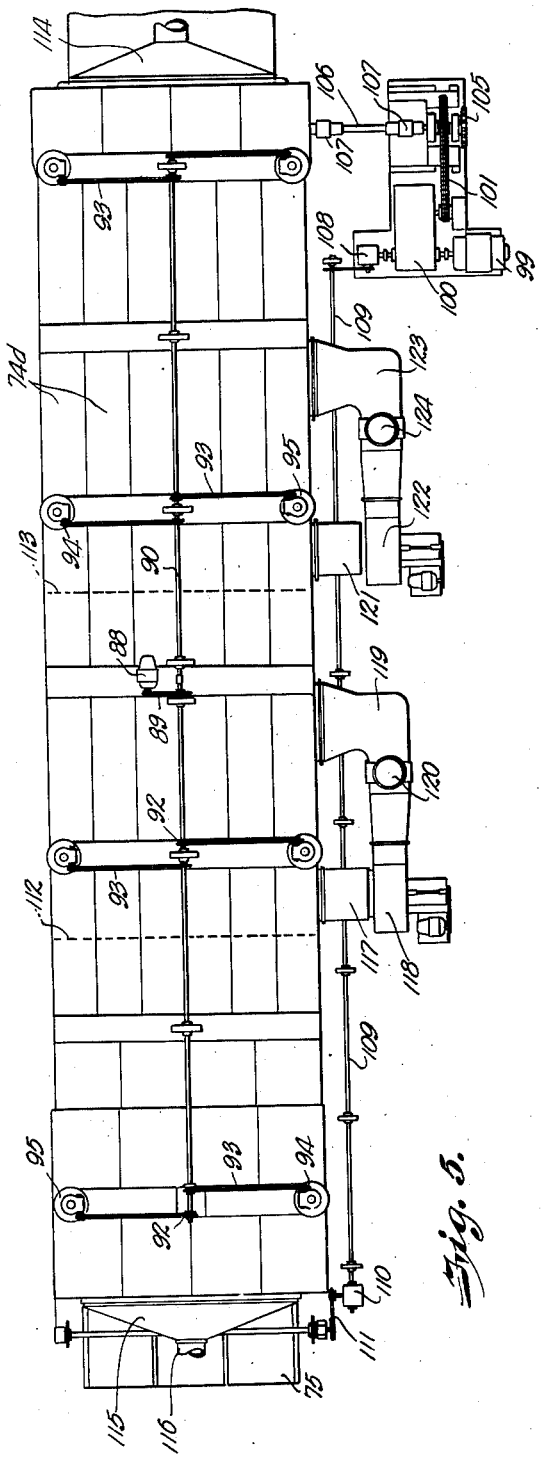

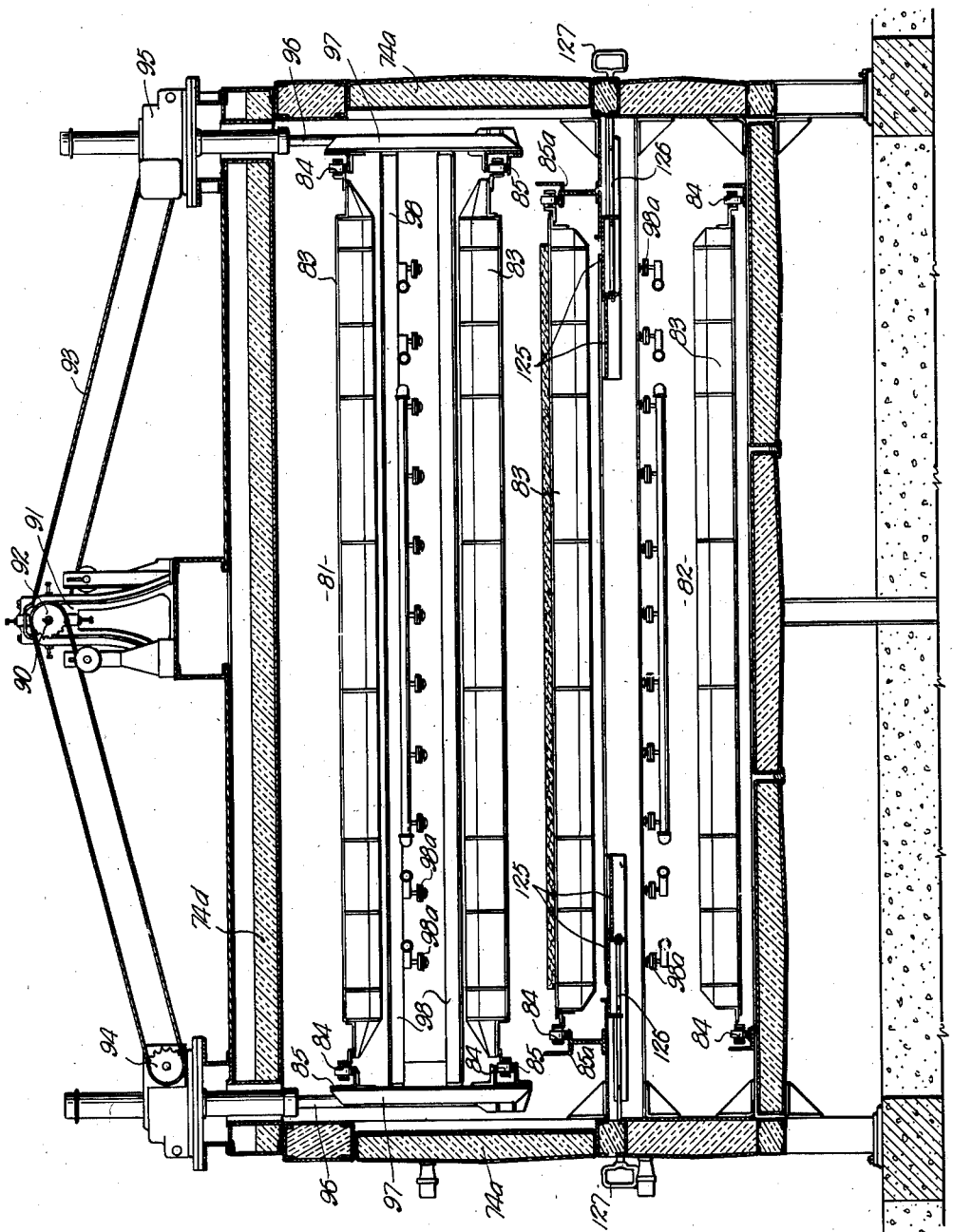

2,467,291

UNITED STATES PATENT OFFICE 2,467,291

PROCESS FOR FORMING FELTED FIBROUS INSULATING MATERIAL

Jay O. Brelsford, Kansas City, Kans., and Hubert O. Sheidley, Kansas City, Mo., assignors to Gustin-Bacon Manufacturing Company, a corporation of Missouri Application October 9, 1944, Serial No. 557,890

3 Claims. (Cl. 154—28)

1

This invention relates to the manufacture of a felted fibrous material and refers more particularly to the production of an insulating material of mineral fibers such as fiber glass. The material is formed of superposed layers or webs of the fibers bonded together with an adhesive or plastic binder which is cured to form an integrally bonded mass.

The process has a resemblance to methods commonly used for making cotton mattresses in that the fibers are combed and carded to form a layer or web which is laid up by cross lapping but differs therefrom in the application of the binder, the moving of the web to form a strip and governing the amount or weight of glass fiber deposited by the rate of travel of the strip. Further differentiation between the instant method and those previously used include the steps of curing the strip of superposed layers to set the binder and unite the layers into a unitary mass.

The simultaneous operations of cross lapping the web, the uniform distribution of the binder and the production of a continuous mat or strip which can be thoroughly and uniformly cured appear to be novel in the art of manufacturing a felted fibrous insulating material from mineral fibers.

In the accompanying drawings which form a part of the instant specification and are to be read in conjunction therewith and in which like reference numerals are used to indicate like parts in the various views, Fig. 1 is a diagrammatic perspective view of a machine employing the process, Fig. 2 is an enlarged detail of the cross lapper, Fig. 3 is a view taken along the line 3—3 in Fig. 2 in the direction of the arrows, Fig. 4 is an elevational view of the cross lapper, Fig. 5 is a plan view of the curing oven, Fig. 6 is a side elevational view of the curing oven, and Fig. 7 is a sectional view through the oven.

*Preliminary operations essential to the formation of the web*

The process will be described in the manufacture of a felted fibrous strip adapted to be used for all types of insulation. The fibers employed in the production of the strip is scrap fiber glass or fiber glass textile waste material obtained from the manufacture of textile threads. The method, however, is not limited or restricted to the employment of inorganic or mineral fiber since any type of fiber will serve according to the purpose for which the strip is to be used. The fiber glass

2 textile waste material which is separated to make up the fibers of the web include forming tube waste, windings, plyings and twistings scrap. These fibers are commonly known by the designations D, F and G, also as 150s, 225s, 450s, and 900s, and have a diameter of .00015 inch to .00040 inch.

This fiber textile waste is received in cartons or sacks and in many instances is matted together, knotted, or in hanks or skeins, depending upon the nature of the handling to which it had been subjected. Some of the fiber pulled from winding cones is in hanks which are badly matted and bunched. In order that the fibers can be processed it is necessary to cut them into lengths of from 1 inch to 3 inches. The matted balls or hanks of thread are first cut on a rotary disk cutter run at a speed of approximately 300 to 100 R. P. M. The general run of the fibers, however, are cut on a machine designed for the purpose and which is hereafter designated as a chopper.

The fiber glass waste is first placed on a sorting table to separate foreign matter other than fiber and any balls or badly matted hanks are removed for separate attention as outlined above. The remaining fibers are sorted and combed by hand in order that they lay as nearly as possible lengthwise and parallel to the shaker feed of the chopping machine. The feed to the chopper is designated by the numeral 10 and is shown at the extreme left in the upper corner of Fig. 1 of the drawing. The feed 10 introduces the fiber to the chopper 11. This feeder receives the fibers and by an oscillating motion feeds them into the chopper feed drum which in turn regulates the flow of fibers to the cutting blades. The feed and rotating blades of the chopper are so arranged that the fibers are cut in substantially three inch lengths. The butter blade or fly knife of the chopper is imbedded in the periphery of a heavy revolving hub or drum. The knife is set at a slight angle with the axis of the drum so that the blade of the knife meets the bed knife over which the fibers are passing with a shearing action. Due to the nature of the glass fibers and their extreme hardness and non-compressibility it is essential to have a certain amount of resiliency or flexibility in the driving mechanism of the chopper. This is accomplished by substituting a V-belt drive in place of the standard chain drive usually furnished with the chopper since the shock of cutting the fibers caused failure of heavy drive chains of the link belt type.

The fibers after being cut are dropped upon a moving belt 12 and delivered to the picker or picking machine 13. The picker consists of a shaft connected to an electrical motor on which are mounted a series of beaters resembling the spokes of a wheel fluted at their end with saw tooth serrations cut therein. These beaters revolve within a hollow drum picking up the fibers as they enter the drum and tearing the fibers apart by the action of the arms. A blower in the beater serves to facilitate the passage of the fibers therethrough. The material after passing through the picker is delivered by discharge pipe 14 to a blower house or condenser 15 and then by means of conveyer 16 to a second picker 17 where further opening and separation of the fiber occurs. The blower house or condenser serves as an accumulating stage and drier for the fiber. The second picker 17 is somewhat more elaborate in its interior mechanism than picker 13 since the fiber twists are rapidly being separated and reduced to single or individual threads. This second picker consists of a large drum upon which are mounted approximately 3000 pins. These pins are substantially ⅜ inch in diameter and 1¾ inches long. The drum is mounted within a casing and receives the fiber through fluted feed rolls as the fiber is discharged into the picker from conveyer 16. These feed rolls limit the amount of fiber charged to the drum in order that the fiber is uniformly distributed and more complete separation is effected. The fiber discharged from picker 17 is transferred upon the conveyer 18 beneath a magnetic panel 19 where any metallic substances having an affinity for the panel are removed. The panel consists of a series of permanent magnets mounted in close proximity to the conveyer and prevents hard metallic objects from entering the Garnett machine. From the conveyer 18 the fiber is discharged into a hopper 20 from which it is picked up by a spiked apron 21 and discharged into a weighing hopper 22. This apron is an endless belt of laterally attached wooden slats in which pins or spikes have been set with the points inclined toward the direction of rotation and upon which the fibers are impaled upon discharge from hopper 20. An eccentric cylindrical comb 23 positioned adjacent the apron 21 serves to comb the excess fiber from the spikes of apron 21, leveling off the amount of material carried by the spiked apron and maintaining a uniform delivery of fibers to the weighing hopper. The delivery of fibers by the spiked apron to the weighing hopper is continued until a predetermined amount has been accumulated. Through a trip mechanism, not shown, the spiked apron is automatically stopped while the weighing hopper delivers its weighed amount of fiber to the feed belt of the Garnett machine diagrammatically shown at 24.

The function of the Garnett machine is to further open the fiber bundles, twists and threads to their individual strands. By passage through a series of combing, carding and stripping stages conventional to a machine of this type, the fibers are further separated into their individual strands and a double web formed. Because of the nature of the glass fibers it was necessary to change the design of the standard Garnett machine in order to successfully handle the material. Certain combinations of the worker, stripper or fancy rolls had to be determined in order that the fiber could be successfully processed, and minor changes were made in the mounting of the rolls and the relative positioning of the rolls in order to obtain improved results in the separation of the fibers. One web is discharged from the lower rolls of the machine and the second web from the upper rolls to be combined as a single web on conveyer 25. The web is received by the hump apron 26 and passes over the top roll of the apron onto apron 27.

*Formation of the felted mat or strip*

The web is carried horizontally by conveyer 27 which delivers it between the down aprons 28 and 29 of the cross lapper.

In Fig. 4 is shown an elevational view of the cross lapper with the aprons, supports and drive mechanisms in greater detail than is shown in Fig. 1. The frame of the cross lapper consists of two tall upright members 30 at one end and two short upright frame members 31 at the opposite end of the frame. Upper horizontal beams 32 are held in place by diagonal supports 33 and 34. Pivoted to frame members 32 at 35 are supports 36. These supports carry the bearings and rolls over which the top conveyer apron 27 operates. At one end they are pivoted at 37 to the top of the cross lapper frame and at their opposite ends have attached thereto cables 38 and counter weights 39. The counter weights balance the cross lapper assembly facilitating lateral reciprocation hereinafter described.

The details of the down apron drive is omitted in the interest of simplicity since the cross lapper mechanism including the hump apron 26, top apron 27, the details of the cross lapper and its essential appurtenances form no part of the present invention except as it furnishes an essential mechanism for cross lapping and superimposing the web upon itself in successive layers to form a mat or strip. In Fig. 4 the cross lapper is shown in full lines in a central position and in dotted lines at its extreme lateral positions. When in the dotted line positions it will be noted that supports 27 have moved on pivot 35 to the dotted line position and the counter balanced weights 39 have raised to the position shown in dotted lines.

The lower end of the cross lapper is supported on a frame or carriage 40 shown in Figs. 2 and 3. Mounted in bearings on the carriage are shafts 41 upon which rotate wheels 42 running in channel tracks 43. These channel tracks are supported by uprights 31 and 30 on opposite sides of the frame.

To cause lateral reciprocation of the carriage and cross lapper the ends of two drive chains 44 are attached to the carriage at 45 by adjustable links 46 on opposite sides of the frame. The drive chains 44 operate over end sprockets 47 and 48 while the lower portions of the chains between the sprockets run in tracks or channels 49 shown in cross section in Fig. 2. The reversible drive which produces the reciprocation of the carriage and cross lapper is through shaft 50 upon which sprockets 48 are mounted. The details of the drive have been omitted since it also is conventional with this mechanism.

The down aprons 28 and 29 operate over upper and lower rolls in the directions indicated by the arrows in Fig. 3, adjacent inner flights of the aprons running downwardly and the outer flights upwardly. As shown best in Figs. 2, 3, and 4 the down apron consists of two slatted belts so mounted and driven that the web delivered to the apron at the top is carried between the two inner or adjacent surfaces in a downward direction. This down apron known as a cross lapper is pivoted at 37 at its upper end to frames 36. Its lower extremity is supported on the oscillating carriage which is driven by the reversing chain drive previously explained. Thus the lower extremity of the apron is caused to travel back and forth above the floor apron 51. By this oscillating motion of the cross lapper the web advancing between the flights of the down apron is delivered onto the floor apron in a series of laps or layers in the form of a felted bat mat. Being pivoted at the top the cross lapper will remain substantially stationary at its upper extremity while the lower or discharge end moves back and forth over the floor apron in a travel varying in width according to the width of the mat or strip desired. By this motion the cross lapper at its midpoint of travel is vertical as shown in the full line position in Fig. 4, and at the etxreme positions on either side the angle between the aprons of the cross lapper and the floor apron decreases to approximately 50° to 60°.

The floor apron is supported on rolls whose shafts are mounted in bearings carried by the upright frame members 52. The floor apron consists of an endless steel belt made up of individual hinged flights which are approximately 11 feet in width to accommodate the mat or strip laid down by the cross lapper. The apron is driven through a variable drive not shown and is mounted at right angles to the movement of the cross lapper. The floor apron moves the mat which is laid down by the cross lapper beneath the discharge end of the down apron forming a continuous strip. The weight of the mat or strip is therefore governed by the speed of the floor apron. In this manner the weight or the density of the material being manufactured is controlled. Since the cross lapper delivers a continuous web from the Garnett machine the movement of the floor apron carrying away or removing the web from beneath the cross lapper will produce a lighter density strip with fewer layers as the speed of the apron is increased. Conversely, as the speed of the apron is decreased, more layers are deposited beneath the cross lapper and the mat or strip produced will have increased density or weight. The thickness of the mat is determined and established by the setting of the flights in the oven where curing of the binder takes place. Thus the density of the mat is determined by the relationship of the weight of material deposited on the apron by the cross lapper and the setting of the flights in the oven for a given thickness.

As the web is being delivered from the cross lapper to the floor apron it is sprayed with a binder or adhesive of any desired character according to the purpose for which the final product is to be used. In the manufacture of an insulating bat or felted mat of fiber glass as herein described the binder was a mixture of phenol formaldehyde, ammonia and dioxane in proportions which will give the mixture proper fluidity and curing properties. The spray is delivered to the web through pipe 53, branch pipes 54 controlled by valves 55 and manifolding 56 into which are tapped spray heads 57. Spray heads 57 as well as the supply pipes and manifolding move with the carriage 40 and cross lapping mechanism. These sprays as shown in Figs. 3 and 4 are located on opposite sides of the web 58 as it is discharged or laid down beneath the cross lapper. As shown in Figs. 2, 3 and 4 the spray nozzles atomize the binder on both sides of the web as it is deposited on the floor apron. It is important that the nozzle capacity be carefully adjusted and designed to furnish the proper amount of spray to the web. The character and extent of the subsequent curing of the mat or stripper is a factor in determining the amount of binder used. The type of the fiber, the thickness of the strip, the character and extent of curing are all of importance in determining the amount and character of the binder applied to the web during the cross lapping operation.

The fluid binder is delivered to the nozzles from central supply tanks maintained under hydrostatic pressure. Pressures normally from 15 to 16 pounds per square inch are adequate to force the binder through the distributing system and produce proper dispersion at the nozzle. The binder should be filtered before reaching the spray nozzles to eliminate insofar as is possible clogging difficulties. The nozzles are preferably mounted in pairs to provide standby equipment in the event of stoppage or failure of any nozzle. The manifolding which supplies the binder fluid to the nozzles is mounted on cross members 41 by means of hinges 59 so regardless of the angular position of the cross lapper the spray jets from the nozzles are at all times projected vertically downward.

In order that the fluid binder atomized from the sprays will not coat the aprons causing the fibers to cling to their surfaces and thereby destroying the integrity of the web, it is necessary that the spray jets be shielded to restrict and limit the pattern or area of the web covered as well as the intermediate zones between the nozzles and web.

Due to the flimsy nature of the web and its extreme lightness, it is necessary that the web be discharged from the bottom of the cross lapper to the floor apron with the least possible interruption either from the cross lapping mechanism or the jetted binder. In other words, to maintain the integrity of the web, spray shields are positioned on both sides of the web extending below the cross lapper. A linkage mechanism is interposed between the cross lapper, the carriage and the pivoted ends of the shields to maintain the shields constantly in a vertical position, offering a vertical channel for the passage of the web regardless of the position of the cross lapper. It will be appreciated that mounting of the spray shields rigidly on the bottom of the down apron would shift the position of the shields altering their planes from the vertical as the lower end of the cross lapper oscillates back and forth. Furthermore, if the shields were permitted to assume the angles of the down apron the discharge of the web from the cross lapper throughout the central portion of its oscillation would be relatively free but restricted and hindered by the shields at the extremities of the oscillations. By the introduction of the linkage the shields are maintained throughout the oscillations of the cross lapper in a vertical position. In addition, the spray shields are designed with curved surfaces at their lower edges to eliminate as much fanning as possible or suction action upon the web as they move back and forth. The shields also serve to protect the down aprons of the cross lapper from the atomized binder jetted from the sprays.

To describe now the structure shields 60 are formed of hollow sheet metal and have a cross sectional shape simulating a teardrop in form as shown in Fig. 3. Their upper edges are pivoted on rods 61 rotatably carried by plates 62 hung from the lower frame member 63 of the cross lapper. Centrally of the frame members 63 on opposite sides of the cross lapper are fixed ears 64. These ears have outwardly extending pins 65 which slide in the bifurcated portion or slots formed in the upper ends of arms 66. The vertical arms 66 are located on opposite sides of the cross lapper and are pivoted at 67 to frame members 40 of the oscillating carriage. The linkage between the vertical arms 66 and the two shields 60 is identical except that on opposite sides of the cross lapper the linkage connects the arm with a different shield. As shown in Fig. 3 pin 68 in the horizontal cross link 69 slides in a slot in the lower portion of the arm 66. The opposite end of the horizontal link 69 from that in which the pin is mounted is pivoted at 70 to the lower end of a vertical link 71. The upper end of link 71 is connected to rod 61 which carries the shield 60. Vertical links 72 also pivoted on rods 61 are connected by turnbuckles 73 to the vertical actuating links 71 and serve to take up looseness or play which may develop in the linkage mechanism.

In operation as the cross lapper is oscillated the carriage which supports the spraying device and the lower end of the down apron will reciprocate back and forth on the tracks 43. As the vertical arms 66 are pivoted at 67 on the side frames 40 of the reciprocating carriage and the ears 64 fixedly attached to the frame of the down apron 63 difference in the respective movement of the carriage and the down apron will be compensated for by the pivoted arm and the freedom of movement which the pins 65 and 68 have in their respective slots. This linkage mechanism maintains the shields 60 in a vertical position throughout the travel of the cross lapper providing a vertical channel at all times for the passage of the web and preventing unevenness in the lay of the web as it is cross lapped in the production of the felted strip on the floor apron.

*Curing of the felted mat or strip*

The series of superimposed layers of the web laid down as a mat or strip upon the floor apron by the cross lapper is moved from beneath the cross lapper by advancement or forward travel of the floor apron. The velocity of this movement will, as suggested, determine the weight of the mat. Upon the floor apron the mat or strip is conveyed to a curing oven diagrammatically shown at 74 in Fig. 1 and in Figs. 5, 6 and 7. In the oven the binder material is set and cured to produce an integral mass of the superimposed layers of the web. The oven is especially designed for the curring operation as will be hereinafter explained. The radiant burners 98a in the oven are arranged above and below the mat to effect curing during its passage through the oven. The curing oven 74, details of which are shown in Figs. 5, 6 and 7, consists of insulated side walls 74a an inlet end wall 74b, a discharge end wall 74c, and a plurality of removable top panels 74d. The enclosing walls of the oven are heavily insulated to prevent heat loss. The top panels and some of the side panels are removable to facilitate repair, adjustment and cleaning of the internal mechanism. In the inlet end of the oven is a rectangular opening sufficiently large to accommodate the mechanism of the transition apron 75 upon which the mat is transferred from the floor apron 51 to the oven flights. At the discharge end of the oven is a similar opening which permits the cured mat to pass from the oven flights to a conveyor which directs the strip or mat to the final cutting operations.

The mechanism of the curing oven may conveniently be divided into an explanation of the conveying mechanism which moves the mat through the oven, the drive for the conveying mechanism, the zones of heating within the oven and the baffling arrangement for controlling passage of the air through the oven zones.

Before describing the oven a brief explanation will be made of the transition apron 75. This consists of a continuous conveyor somewhat wider than the width of the mat and located between the floor apron and oven conveyors in the entrance to the oven. This apron is carried upon a series of rolls, diagrammatically shown at 76, 77, and 78, and is driven from a sprocket 79 from the main drive which will be hereinafter explained. Counterweights 80 compensate for expansion and contraction in the length of the conveyor. The speed of travel of the transition apron is synchronized both with the floor apron and the oven conveyors, the oven flights or conveyor travelling somewhat faster than the transition apron in order to stretch and align the fibers of the mat as they pass from the apron onto the oven conveyor.

The oven conveyors or flights above and below the mat during the curing operation consist of a lower conveyor 81 and an upper conveyor 82. The conveyors are made up of a plurality of transverse flights or support members 83, best shown in Fig. 7. The ends of these flights are attached to the links of continuous chains 84 supported on upper rail members 85 and lower rail members 85a. The mat is supported in its passage through the oven on the advancing or upper set of flights of the lower conveyor. At both the inlet and outlet ends of the oven chains 84, supporting the ends of the flights of the conveyors, are reversed on sprocket wheels 86 and 87. Counterweights 87a keep a constant tension upon the conveyors taking up elongation or allowing for shortening of the conveyors due to temperature conditions within the oven.

The positioning of the upper conveyor in the oven and the proximity between the adjacent flights of the upper and lower conveyors will determine the thickness of the mat as it is discharged from the oven after curing. At the inlet end of the oven the upper conveyor is constructed with an upward tilt or angularity with respect to the lower conveyor. This is to accommodate the maximum thickness of the mat as it arrives from the crosslapping operation and provides for gradually reducing its thickness to the desired amount in the curing oven.

The lower conveyor 81 is fixed within the oven. The upper conveyor 82 is adjustable and may be set at a desired position above the lower conveyor so that the distance between the adjacent flights of the upper and lower conveyors establishes the thickness of the mat. Positioning or adjustment of the upper conveyor is accomplished by a power driven mechanism, in the drawings shown as a motor 88 in Fig. 5. The motor is reversible and is controlled through a circuit not shown. Power from the motor is transmitted through a flexible drive 89 to shaft 90 which extends longitudinally along the top of the oven and is carried in bearings which are mounted on brackets 91. At intervals along the shaft 90 are positioned sprockets 92 over which run flexible chains 93. These chains drive sprockets 94 located on Abart assemblies located along the sides and on top of the oven. The Abart assemblies include vertical worm shafts driven by worm gears enclosed within the housing 95. Sprockets 92, 94 and chains 93 transmit the power from the shaft 90 to the Abart assemblies to raise and lower the vertical shaft 96 which form the lower extremities of the worm shafts of the Abart assemblies. Vertical shafts 96 support the frame 97 which comprises longitudinal and vertical members within the oven which carry tracks 85 upon which the upper flight rollers run and transverse members 98 which extend across the oven and upon which burners 98a are mounted. The operation, in brief, of raising and lowering the upper conveyor is obvious from the explanation. Power from the motor 88 is transmitted to shaft 90 thence through chains 93 to Abart assemblies. According to the direction of the motor travel the frame 97 and upper conveyor will be raised and lowered the desired amount. The arrangement of burners 98a between the flights of the upper and lower conveyors is such as to give an even distribution of heat throughout the oven with the circulation of air which will be hereinafter explained.

The drive for the two conveyors is preferably from a direct current motor or other suitable source of power, shown diagrammatically at 99, through a reduction gear enclosed within casing 100. Power is transmitted from the motor through a flexible drive 101 to a sprocket 102 mounted upon a shaft 103. Shaft 103 also carries sprockets, not shown, located within and upon opposite sides of the oven. Over these sprockets run chains 84 which carry the flights of the lower conveyor. Also on shaft 103 is a gear 104 which meshes with a gear 105 located above and mounted upon and driving shaft 106. The upper shaft 106 has interposed therein universal joints 107 which accommodate the drive to the adjustability of the upper conveyor. Within the oven on an extension of shaft 106 are sprockets, not shown, which carry and drive the lateral chains 84 of the upper conveyor and correspond to the sprockets on the lower shaft 103 which drive the lower conveyor.

An auxiliary drive from motor 99 through the reduction gear 100 and gearing within the housing 108 drives shaft 109. This shaft, through a gear reduction 110 and flexible drive connection 111, rotates sprocket 79 and thereby drives the transition apron 75.

In order to uniformly heat the mat during curing, besides locating the burners between the upper and lower conveyors to evenly distribute the heat, the oven is partitioned into three zones, the vertical partitions shown diagrammatically by the dotted lines 112 and 113. These partitions have openings therethrough to permit passage of the conveyor flights and mat. The first zone extending from the inlet end of the oven to partition 112 has a top outlet breeching 115 connected to an exhaust fan by pipe 116. Thus, in the first zone the heated air is drawn upwardly through the mat and is discharged from the oven from above. In the second zone between partitions 112 and 113 the heated air is withdrawn from the oven through pipe 117 positioned above the mat and is discharged by means of a blower fan 118 back into the oven below the mat through pipe 119. A portion of this recirculated air is bled off to the stack through an auxiliary line 120. In the third zone between partition 113 and the discharge end of the oven heated air from the oven is withdrawn from below the mat through pipe 121 and is discharged by fan 122 through pipe 123 into the oven above the mat after which a portion is exhausted through outlet breeching 114. This circulating system likewise has a bleed-off line 124 similar to pipe 120 which diverts a portion of the heated gases to the stack.

By zoning the oven in this manner and circulating the heated air as described a uniform curing of the mat is assured.

As a further method of concentrating the circulation of air onto and through the mat there are arranged along the lateral edges of the oven throughout its length or, if preferred, within selected zones telescopic baffle plates 125 adjustable by rods 126 which have handles 127 at their ends outside the oven. These baffles serve to restrict the air circulation centrally of the oven and prevent bypassing of the heated air around the ends of the conveyors and are also useful when a narrow width mat is being run.

To briefly describe the oven operation, as the mat arrives from the cross lapper on the floor apron it is transferred to the transition apron thence into the inlet end of the oven onto the lower conveyor. The upper conveyor has been adjusted to a proper position so that the adjacent flights will squeeze the mat to the desired thickness. Since the upper and lower conveyors run at the same speed and slightly faster than the transition apron, as the mat enters the oven it will be slightly stretched tending to better align the fibers prior to curing. Sufficient burners throughout the oven located between the upper and lower conveyors will be lighted to raise the temperature of the oven to the desired degree for curing the bonding substance of the mat. While passing through zone number one at the inlet end of the oven the heated air is drawn upwardly through the mat. In the second zone the heated air is withdrawn from above the mat and is discharged below the mat which circulation applies the curing heat from below. In the third zone the heated air is removed from below the mat and is discharged onto the top surface applying the curing heat from above.

From the oven the continuous mat or strip is passed through a slitter, not shown, which trims the edges and cuts the strip longitudinally according to the width desired. A separate transverse cutter, also omitted from the drawings, cuts the strip crosswise into convenient size according to the purposes for which the product is to be used.

The resultant cured bats or insulating elements have certain novel features not found in conventional types of insulation, briefly enumerated as follows:

1. The material from which the strip is produced being inorganic glass fiber is fireproof and has a low affinity for moisture.

2. By combining the inorganic fibers in a felted mass and bonding the felted layers with a binder which upon curing produces an integral structure, there is obtained a product that is semi-rigid and capable of supporting its weight, but one which remains flexible and will return to its original shape after being folded and crushed.

3. As the fibers are well opened up and separated and the web felted by cross lapping, the structure produced offers a high air flow resistance and consequently has a high acoustic value.

4. The completed product is easily cut and shaped and may be readily faced with various types of surfacing by gluing, cementing or stitching.

5. The product can also be used as an insulation or lapping material for pipes and ducts because of its flexible nature.

6. Finally, it has a light weight and density running from one to two pounds per cubic foot according to the type of fiber and the extent of separation of the fibers.

Having thus described our invention, we claim:

1. A process of forming a strip of felted fibrous insulating material comprising the steps of separating the mineral fibers and forming a web of the fibers wherein the fibers are of substantially uniform length and laid up longitudinally of the web, cross lapping the web to build up a mat constituting a plurality of layers, moving the mat from the location of the cross lapping operation to form a continuous strip of cross lapped layers, and stretching the strip in a direction transverse to the lay of the fibers as the strip passes a predetermined point in its travel away from the location of the cross lapping operation.

2. A process of forming a strip of felted fibrous insulating material comprising the steps of separating mineral fibers and forming a web of the fibers wherein the fibers are of substantially uniform length and are laid up longitudinally of the web, cross lapping the web to build up a mat constituting a plurality of layers, introducing a binder into the mat, moving the mat from the location of the cross lapping operation to form a continuous strip of cross lapped layers, stretching the strip in a direction transverse to the lay of the fibers as it passes a predetermined point in its travel away from the location of the cross lapping operation, passing the stretched strip through a curing step to integrally bond the fibers, and applying a uniform compressive force to the strip continuously throughout the curing step.

3. A process of forming a strip of felted fibrous insulating material comprising the steps of separating mineral fibers and forming a web of the fibers wherein the fibers are of substantially uniform length and are laid up longitudinally of the web, cross lapping the web to build up a mat constituting a plurality of layers, introducing a binder into the mat, moving the mat from the location of the cross lapping operation to form a continuous strip of cross lapped layers, stretching the strip longitudinally as it passes a predetermined point in its travel away from the location of the cross lapping operation, passing the stretched strip through a curing step to integrally bond the fibers, and applying a uniform compressive force to the strip continuously throughout the curing step.

JAY O. BRELSFORD.
HUBERT O. SHEIDLEY.

REFERENCES CITED

The following references are of record in the file of this patent:

UNITED STATES PATENTS

| Number | Name | Date |
|---|---|---|
| 1,765,025 | Miller | June 17, 1930 |
| 1,887,673 | Borcholt et al. | Nov. 15, 1932 |
| 1,958,819 | Grayson | May 15, 1934 |
| 1,999,169 | Jackson | Apr. 23, 1935 |
| 2,154,476 | Simpson et al. | Apr. 18, 1939 |
| 2,206,059 | Slayter (2) | July 2, 1940 |
| 2,222,633 | Sheesley | Nov. 26, 1940 |
| 2,331,145 | Slayter (1) | Oct. 5, 1943 |
| 2,333,218 | Von Pazsiczky | Nov. 2, 1943 |
| 2,341,130 | Unsworth | Feb. 8, 1944 |

FOREIGN PATENTS

| Number | Country | Date |
|---|---|---|
| 450,689 | Great Britain | July 23, 1936 |